UNITED STATES PATENT OFFICE 2,469,848

PREPARATION OF FLUOROHYDROCARBONS

Leroy Frank Salisbury, Wilmington, Del., assignor to E. I. du Pont de Nemours & Company, Wilmington, Del., a corporation of Delaware No Drawing. Application March 21, 1945, Serial No. 584,034

7 Claims. (Cl. 260—653)

This invention relates to the preparation of fluorohydrocarbons and especially of vinyl fluorides. More particularly this invention relates to a novel catalyst and its use in the preparation of vinyl fluorides.

Many metals and metal oxides, either alone or supported on suitable substrates, are known to catalyze the reaction between acetylene and hydrogen fluoride to produce vinyl fluoride. Particularly well-known compositions are those obtained by impregnating charcoal with a suspension of mercury oxide or by formation of the oxide in situ on the charcoal. In the copending application of Leroy Frank Salisbury, Serial No. 508,243, filed October 29, 1943, now U. S. Patent No. 2,426,792, highly useful charcoal-supported mercury compound catalysts are disclosed as employable in the synthesis of vinyl fluoride and fluoroprene. Although these catalysts and especially those disclosed in the aforementioned application of Leroy Frank Salisbury are advantageously useful for their designed purposes, at times they are characterized by certain disadvantages. Thus, a large part of the total mercury present in the charcoal may be lost as free mercury during the catalyst preparation or operation, thereby reducing the activity of the catalyst and increasing the cost of the operation. Charcoal-supported catalysts, although initially very active in the fluoroprene synthesis, gradually become inactive. For instance, in 12–16 hours these compositions may frequently lose as much as 50% of their initial activity.

In the application of Arthur Livingston Barney, Serial No. 517,837, filed January 11, 1944, there are also described, mercuric catalysts supported on salts of alkaline earth metals for the synthesis of vinyl fluorides. Although these compositions do not decrease in activity so rapidly as the charcoal-supported catalysts, their usefulness is somewhat limited by the formation of polymers in the reactor, thereby requiring discontinuance of the operation before a substantial decrease in the activity of the catalyst is evident.

This invention has as an object the provision of a method for obtaining fluorohydrocarbons which is not subject to the aforementioned disadvantages. A further object is the provision of a practicable process for obtaining compounds of the general formula RCF=CH₂, wherein R is of the group consisting of hydrogen atoms, monovalent saturated hydrocarbon radicals, and hydrocarbon radicals containing as the sole unsaturation an ethenic double bond. A still further object is to provide a new and improved method for obtaining vinyl fluoride from acetylene and hydrogen fluoride. Still another object is to provide a new and improved method for preparing 2-fluoro-1,3-butadiene from monovinyl acetylene and hydrogen fluoride. A still further object is the provision of a new and useful catalyst for the reaction between hydrogen fluoride and a compound having the general formula RC≡CH to provide a compound having the general formula RCF=CH₂, R in said general formulae being of the group consisting of hydrogen atoms, monovalent saturated hydrocarbon radicals and monovalent hydrocarbon radicals containing an ethenic double bond as the sole unsaturation. Additional objects will become apparent from an examination of the following description and claims.

These and other objects and advantages are accomplished according to the herein-described invention which broadly comprises a discrete body of a solid, macromolecular, hydrogen-fluoride resistant organic polymeric material containing a mercury compound. A mixture of hydrogen fluoride and a compound having a molecular weight of not more than 80 and the general formula RC≡CH is passed in the vapor phase over one or a plurality of said discrete bodies under substantially anhydrous conditions, and there is obtained a compound having the general formula

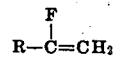

R in said general formulae being a member of the group consisting of hydrogen atoms, monovalent saturated hydrocarbon radicals and monovalent hydrocarbon radicals containing an ethenic double bond as the sole unsaturation.

In a more restricted embodiment, this invention comprises passing a mixture of hydrogen fluoride and a hydrocarbon, of molecular weight not greater than 80, having the general formula R'—CH=CR''—C≡CH, wherein R' and R'' are of the group consisting of hydrogen atoms and monovalent saturated hydrocarbon radicals, over a catalyst comprising mercury oxide at least partially combined chemically with an oxide of nitrogen, said mercury compound being supported by filaments of a solid macromolecular, synthetic, organic polymer which is substantially unaffected by anhydrous hydrogen fluoride and by said mercury compound, said gaseous mixture being passed over said catalyst under substantially anhydrous conditions at a temperature within the range of from 20° C. to 100° C One preferred embodiment of this invention comprises passing a mixture of hydrogen fluoride and acetylene, in which the mol ratio of hydrogen fluoride to acetylene is within the range of from 1.5:1 to 1:2, over filaments consisting of from 70% to 90% by weight of basic mercuric nitrate intimately associated with from 30% to 10% by weight of a solid, macromolecular, synthetic, organic polymer which is substantially unaffected by anhydrous hydrogen fluoride and basic mercuric nitrate, the gaseous mixture being passed over said catalyst under substantially anhydrous conditions at a temperature within the range of from 25° C. to 60° C., the contact time of said mixture with said catalyst being within the range of from 10 seconds to 100 seconds.

Another preferred embodiment of this invention comprises passing a mixture of hydrogen fluoride and monovinylacetylene, in which the mol ratio of hydrogen fluoride to monovinylacetylene is within the range of from 1.5:1 to 1:2, over filaments consisting of from 70% to 90% by weight of basic mercuric nitrate intimately associated with from 30% to 10% by weight of a solid, macromolecular, synthetic, organic polymer which is substantially unaffected by anhydrous hydrogen fluoride and basic mercuric nitrate, the gaseous mixture being passed over said catalyst under substantially anhydrous conditions at a temperature within the range of from 25° C. to 60° C., the contact time of said mixture with said catalyst being within the range of from 10 seconds to 100 seconds.

In one practical and preferred adaptation of this invention a solid, macromolecular, synthetic, organic polymer, which is substantially unreactive with anhydrous hydrogen fluoride, and with the mercury compound used as a catalyst, under the reaction conditions, is dissolved in a suitable solvent. To the resulting solution is added the mercury compound in the form of a fine powder and the mixture is agitated until it is homogeneous. Fibers are spun from the resulting composition and the fibers are then dried and collected. A reactor is charged with said fibers and the reaction mixture is passed therethrough, the resulting products being collected and isolated by conventional means.

The following examples, in which proportions are in parts by weight, unless otherwise specified, are given for illustrative purposes and are not intended to place any restrictions on the hereindescribed invention.

*Example I*

One hundred ten grams of chlorotrifluoroethylene-tetrafluoroethylene-vinyl fluoride interpolymer, containing 26% chlorotrifluoroethylene, 21% tetrafluoroethylene, and 53% vinyl fluoride, are dissolved in 625 g. of acetone and the solution is filtered. To the filtered solution is added about 200 g. of a mixture consisting of 69% precipitated basic mercuric nitrate and 31% calcium fluoride, said mixture having been comminuted to 200 mesh. The mixture is stirred until it is homogeneous, filtered through a 200 mesh screen and then extruded into an electrostatic field. The disoriented staple fibers which are obtained in this manner are collected and dried in vacuo at 25° to 30° C. to remove acetone and moisture. The dried fibers are found to contain 26.2% mercury, 0.96% nitrogen and 9.3% calcium.

The precipitated basic mercuric nitrate used in the preparation of the above catalyst is made by adding sodium hydroxide solution to a vigorously stirred solution of mercuric nitrate in nitric acid until the pH of the suspension is about 2 or 3, as indicated by Congo red paper. The precipitate is separated by filtration, thoroughly washed with water, and dried at 120° C. A typical preparation is found to contain 80.2% mercury and 2.82% nitrogen, which is in good agreement with the composition calculated for $(HgO)_2$—$HNO_3$.

For the synthesis of 2-fluoro-1,3-butadiene, 80 g. of the fiber prepared as described above are packed uniformly into a 1.5" diameter iron pipe having a total volume of 750 cc. and a dry mixture of substantially equimolar parts of anhydrous hydrogen fluoride and monovinylacetylene, together with about 60% of nitrogen, by volume, as a diluent is passed through the catalyst bed at a contact time of about 45 seconds and at a temperature of about 25° to 50° C. During 117 hours of operation an average conversion to 2-fluoro-1,3-butadiene of 25%, based on the monovinylacetylene passed, is obtained. In addition, a small amount of 3,3-difluoro-2-butene is obtained. The product and unchanged monovinylacetylene are recovered by conventional fractional distillation.

*Example II*

Eight hundred sixty-three grams of precipitated basic mercuric nitrate are screened to pass 200 mesh and suspended in a solution of the tetrafluoroethylene-chlorotrifluoroethylene-vinyl fluoride interpolymer of Example I, said solution containing 200 g. of the interpolymer in 900 g. of acetone. After thorough mixing the suspension is filtered through a 200 mesh screen, spun as described in Example I, and the fibers collected and dried. The product is found to contain 66.8% mercury.

A sample of the product prepared as described above, is employed in the synthesis of 2-fluoro-1,3-butadiene in essentially the same manner as described in Example I. The dry mixture of hydrogen fluoride and monovinylacetylene in molar ratio of about 14:10 is diluted with about 69% by volume of nitrogen and passed at 25° to 50° C. at a contact time of about 46 seconds, through a cylindrical iron reactor packed with the catalyst at a concentration of 192 g. of catalyst per liter of reactor space. During 295 hours, 4,899 g. of monovinylacetylene containing 377 g. of 2-fluoro-1,3-butadiene are introduced and the product obtained consists of 2,064 g. of monovinylacetylene and 3,463 g. of a mixture of 2-fluoro-1,3-butadiene and 3,3-difluoro-1-butene in a weight ratio of about 97:3. The average conversion of monovinylacetylene to 2-fluoro-1,3-butadiene is 45%, and the yield based on the monovinylacetylene consumed is 79%.

*Example III*

Four hundred fifty-three grams of basic mercuric nitrate ground to pass 200 mesh, 150 g. of a homopolymer of ethylene prepared as described in U. S. 2,153,553, and having an average molecular weight of about 25,000, and about 600 g. of xylene are heated to about 125° C. with agitation. The product is cooled, broken into lumps and dried at ordinary temperatures until the total weight of the product indicates that about 67 g. of the xylene are still retained. This mixture is extruded under pressure at a temperature of 95° to 125° C. through a multiple orifice spinneret having orifices of 0.01" diameter. The continuous filaments thus obtained are dried in air to remove the xylene and then exposed at ordinary temperatures to a vacuum to remove moisture.

The filaments are cut into short lengths and used with good results as a catalyst in the synthesis of 2-fluoro-1,3-butadiene in the manner described in Example I.

*Example IV*

Thirty-five grams of a fibrous catalyst composed of 85% precipitated basic mercuric nitrate and 15% of the tetrafluoroethylene-chlorotrifluoroethylene-vinyl fluoride interpolymer of Example I are packed uniformly in a tubular iron reactor whose volume is about 240 cc. A dry mixture of hydrogen fluoride and acetylene in a mol ratio of 12:10 is passed through the catalyst bed at a contact time of about 51 seconds and at a temperature of 35° to 50° C. The average conversion of acetylene to vinyl fluoride during 150 hours of operation is about 61% and the average yield for this period is 94%.

*Example V*

A dry mixture of hydrogen chloride and acetylene in a mol ratio of 12:10 is passed at 87° to 100° C. and at a contact time of about 80 seconds through a glass reactor packed with 200 g. of catalyst per liter of reactor space. The catalyst, after being packed in the reactor is treated with hydrogen chloride for several hours before the acetylene addition is begun. Forty minutes after acetylene addition is started the conversion to vinyl chloride is 16% based on the acetylene passed, as determined by hydrogen chloride consumption. The catalyst used in the above example is that described in Example IV.

*Example VI*

An acetone solution containing about 13% of a mixture of interpolymers of vinyl fluoride, tetrafluoroethylene, and chlorotrifluoroethylene is filtered and extruded into an electrostatic field. The fibers are treated with a suspension of basic mercuric nitrate in acetone-water (6/1), and loose powder is shaken off after the solvent has evaporated. The coated fibers obtained in this manner are dried in vacuo at room temperature over anhydrous calcium sulfate, and are found to contain 45.5% mercury and 2.8% water. For the synthesis of fluoroprene about 57 grams of this composition are placed in a 1.5 inch diameter iron tube having a total volume of about 500 cc., and a dry mixture of anhydrous hydrogen fluoride and monovinylacetylene in a mol ratio of 12 to 10, together with about 60% by volume of nitrogen as a diluent, is passed through the catalyst bed at a contact time of about 45 seconds and at a temperature of about 25° to 50° C. During 145 hours of operation an average conversion to fluoroprene of 41% is obtained, based on the monovinylacetylene passed, at a yield of 81% based on monovinylacetylene consumed. In addition a small amount of 3,3-difluor-1-butene is obtained.

While this invention has been illustrated with particular reference to certain polymers, it is to be understood that any solid, macromolecular polymer, which is substantially unaffected by anhydrous hydrogen fluoride and by the mercury compound supported thereby, may be employed. The polymers operative in this invention are macromolecular organic compounds containing a plurality of recurring units, i. e., are high polymers. More specifically said polymers are organic compounds having a degree number, i. e., a degree of polymerization of at least 100, as defined by Staudinger in Die hochmolekularen organischen Verbindungen (1932) cited by Marvel and Horning in 1 Gilman, Organic Chemistry (2d ed., 1943), 741. The recurring units in said polymers may be the same or they may be different. Said polymers may be naturally occurring materials or their derivatives, such as petroleum wax melting above 90° C. or chlorinated rubbers, or they may be synthetic materials. Synthetic polymers are preferred in view of the fact that said polymers may be obtained with uniform properties from batch to batch. Synthetic polymers particularly well adapted for use in this invention are hydrocarbon polymers and polymers composed of carbon, hydrogen and halogen. Included among examples of said synthetic polymers are polyvinyl chloride; polyvinylidene chloride; interpolymers of vinyl chloride with vinylidene chloride; interpolymers of vinyl fluoride with tetrafluoroethylene; interpolymers of vinylidene chloride with styrene; interpolymers of vinylidene chloride with allyl chloride; polystyrene; polytetrafluoroethylene; polyethylenes such as are disclosed in U. S. Patents 2,153,553 and 2,188,465; and the normally solid interpolymers of ethylene with other polymerizable compounds, such as isobutylene, styrene, vinyl fluoride, vinyl chloride, tetrafluoroethylene, and the like. Polymers which are particularly well adapted for use in the practice of this invention (because of the ease with which they are formed into fibers, tapes and the like and their inertness toward the mercury compound supported thereby and toward hydrogen fluoride) are those formed by the interpolymerization of chlorotrifluoroethylene, tetrafluoroethylene and vinyl fluoride and which contain from 20% to 90% by weight of chlorotrifluoroethylene, from 5% to 75% by weight of tetrafluoroethylene and from 10% to 80% by weight of vinyl fluoride.

It is to be understood that a mercury compound must be incorporated with the aforementioned polymers. Included among examples of said mercury compounds are: mercuric acetate, mercuric carbonate, mercuric oxide and mercuric chloride. However, improved yields are had when the mercury compound employed is mercuric oxide at least partially combined chemically with an oxide of nitrogen; maximum yields are obtained when the mercury compound employed is basic mercuric nitrate, said basic mercuric nitrate being generally more active than other mercury compounds. The basic mercuric nitrate may be prepared by grinding together an equimolar mixture of concentrated nitric acid and mercuric oxide or, if preferred, it may be prepared by adding an alkali hydroxide solution, e. g., sodium hydroxide solution, to a well-stirred solution of mercuric nitrate in dilute nitric acid in the proportion of one gram equivalent of alkali hydroxide to one mol of mercuric nitrate, in addition to the alkali required to neutralize the nitric acid present.

The novel catalysts of this invention are discrete bodies composed of a mercury compound or admixture of mercury compounds intimately associated with one or more of the aforementioned polymers. Said discrete bodies may be in the form of pellets, or sheets, or ribbons, or of any other suitable shape. However, on account of their greater surface, the ease with which they may be prepared and the improved yields had therewith, said discrete bodies are ordinarily in the form of filaments, i. e., monofilaments, long fibers or staple fibers. Although filament diameter does not appear to be a critical factor, for greater efficiency as a catalyst it is generally preferred to employ filaments having a diameter within the range of from 0.01 mm. to 0.5 mm.; and it is especially advantageous to employ filaments having a diameter within the range of from 0.02 mm. to 0.1 mm.

The ratio by weight of mercury compound to polymer in the aforementioned discrete bodies may be varied over relatively wide limits, e. g. within the range of from 1:19 to 19:1 However, maximum yields are obtained when said ratio is within the range of from 7:3 to 9:1.

The examples have illustrated preparation of the catalytically active fibers by melt extrusion and by extruding a solution of the polymer into an electrostatic field. Alternately, the catalytically active material can be added to a solution or dispersion of the polymer and fibers formed from the resulting composition by any of the conventional methods such as wet or dry spinning. The particular method employed for preparing these fibers is determined by the nature of the polymer and catalytically active mercury compound used. Thus, with polyethylenes it is generally more convenient to employ melt extrusion methods while with vinyl resins it is preferable to form the fibers by wet or dry spinning. If desired, the polymeric material can be used in the form of a pellet, as a lump, or in a finely powdered state, and admixed with the catalytically active mercury compound before or after conversion to the desired form. For example, an intimate mixture of finely divided basic mercuric nitrate and polytetrafluoroethylene may be molded into pellets or rolled into sheets or ribbons at ordinary temperature to form active catalytic compositions. When a mercury compound which is soluble in the solvent used in spinning the polymer is employed, e. g., mercuric acetate, or mercuric chloride, it may be added directly to the polymer prior to formation of the discrete body. When insoluble mercury compounds are employed, e. g., insoluble basic mercuric nitrate, carbonate or oxide, said compound may be mixed with the polymer either by first melting the polymer or by dissolving the polymer in a suitable solvent and then homogenizing the mixture by suitable agitation.

A suitable form of apparatus for use in the synthesis of fluorohydrocarbons according to the process of this invention consists of a reactor which for all scale operations may be constructed from a piece of iron pipe and which contains the catalyst. The reactor may be equipped with an internal temperature measuring device and is preferably immersed in a bath of suitable liquid, e. g., water, so that the internal temperature may be controlled. The gaseous mixture after contact with the catalyst passes through an absorbent for the excess hydrogen fluoride, if any, such as granular soda lime, a drier, and finally a trap cooled with solid carbon dioxide-acetone mixture. The reaction product which collects in the cold trap is separated into its individual components by fractional distillation.

For efficient operation in the synthesis of 2-fluoro-1,3-butadiene from hydrogen fluoride and monovinylacetylene, the reacting gases should not be mixed before entering the reaction chamber. If this precaution is not observed, i. e., if the gases are mixed before they enter the reactor, the reaction between the monovinylacetylene and hydrogen fluoride proceeds as usual but the feed line to the reactor soon becomes plugged with a hard solid containing less than 10% fluorine. This unwanted reaction is sometimes so rapid that the run must be stopped and the apparatus dismantled within one hour from the start of the operation. One practical way of overcoming this serious difficulty is to introduce the gases into the reactor separately, e. g., through a T-fitting at the entry of the reactor. This simple device leads to the very unexpected result of completely eliminating stoppage, which takes place if the gases are mixed beforehand. The gases can, however, be mixed before they come in contact with the catalyst, provided this is done over a granular material such as charcoal. For example, the T-fitting at the entry end of the reactor may be, and preferably is, filled with dry, granulated, charcoal or with the catalyst itself. In practice, anhydrous hydrogen fluoride is metered and led to one end of the T-fitting, and the anhydrous acetylene is also metered and led to the other end of the fitting. An inert gas such as nitrogen may be mixed with either the hydrogen fluoride or the acetylene, if desired.

While a form of apparatus suitable for use on a small scale has been described, the operation may be conducted successfully in any appropriate apparatus, provided the precautions indicated above are observed.

Any compound having a molecular weight of not more than 80 and the general formula $RC{\equiv}CH$, wherein R is of the group consisting of hydrogen atoms, monovalent saturated hydrocarbon radicals and monovalent hydrocarbon radicals containing as the sole unsaturation an ethenic double bond, may be reacted with hydrogen fluoride in accordance with the process of this invention. One group of compounds of the aforementioned general formula which is particularly well adapted for use in the process of this invention is that group of compounds having a molecular weight of not more than 80 and the general formula $R'CH{=}CR''{-}C{\equiv}CH$, wherein R' and R'' are selected from the group consisting of hydrogen atoms and monovalent saturated hydrocarbon radicals. Included among examples of compounds having the formula $RC{\equiv}CH$ as hereinbefore defined are: acetylene, monovinylacetylene, methylacetylene, 3-pentene-1-yne, 3-hexene-1-yne, 3-methyl-3-butene-1-yne, and the like.

Although the process of this invention may be effected at any desired temperature below the softening point of the polymer and above about 0° C., markedly improved results are obtained when the temperature employed is within the range of from 20° C. to 100° C. However, optimum results are had when said process is effected at a temperature within the range of from 25° C. to 60° C.

The mol ratio of hydrogen fluoride to the compound having the general formula $RC{\equiv}CH$ as hereinbefore defined may be varied over a wide range such as for example 3.5:1 to 1:2. However, in order to provide, as the principal product, compounds having the formula $RCF{=}CH_2$, wherein R is of the group consisting of hydrogen atoms, monovalent saturated hydrocarbon radicals and monovalent hydrocarbon radicals containing as the sole unsaturation an ethenic double bond, it has been found that the mol ratio of hydrogen fluoride to compound $RC{\equiv}CH$ should be within the range of from about 1.5:1 to about 1:2 in order to obtain maximum yields.

Conversion of the hydrocarbons is effected by passing the hydrocarbon-hydrogen fluoride reaction mixture over the catalyst in the vapor phase at a controlled rate of flow. Said rate may be varied within relatively wide limits. In the synthesis of 2-fluoro-1,3-butadiene optimum results are obtained when said rate is such that the time of contact of the reacting gases with the catalyst is within the range of from 10 seconds to 100 seconds.

The reaction is preferably carried out at atmospheric pressures but superatmospheric and subatmospheric pressures can also be used, the only limitation being that the reactants and products must remain gaseous at the temperature and pressure employed.

The ratio of catalyst charged to total reactor space can be varied widely. Thus, in the synthesis of 2-fluoro-1,3-butadiene maximum efficiency is had when the catalyst is employed in an amount such that the concentration of mercury compound, calculated as elemental mercury, is within the range of from 75 g. to 100 g. per liter of reactor space. It is to be understood, however, that appreciable effects are had when said concentration is as low as 10 g. per liter of reactor space and when it is as high as 250 g. per liter of reactor space. Concentrations beyond these limits can be employed but at a sacrifice in efficiency.

The compounds $RCF=CH_2$, e. g., vinyl fluoride and 2-fluoro-1,3-butadiene, produced in accordance with the hereindescribed process, are useful in the production of plastics and synthetic rubbers.

While the novel catalysts of this invention are peculiarly well adapted for use in the reaction between hydrogen fluoride and an acetylenic hydrocarbon to provide ethylenically unsaturated fluorohydrocarbons, said catalysts may also be used successfully to promote the reaction between hydrogen chloride and a hydrocarbon having a molecular weight of not more than 80 and the general formula $RC\equiv CH$, wherein R is of the group consisting of hydrogen atoms and hydrocarbon radicals, whereby compounds having the general formula $RCCl=CH_2$, wherein R is of the group consisting of hydrogen atoms and hydrocarbon radicals, are produced. Higher temperatures, preferably in the range from 100° to 150° C., are used to advantage when hydrogen chloride is employed, instead of hydrogen fluoride. Since higher temperatures are employed, it is also necessary to use higher melting polymers as catalyst supports.

As many apparently widely different embodiments of this invention may be made without departing from the spirit and scope thereof, it is to be understood that I do not limit myself to the specific embodiments thereof except as defined in the appended claims.

Having described the present invention, the following is claimed as new and useful:

I claim:

1. The process for obtaining a fluorohydrocarbon, which comprises passing a mixture of hydrogen fluoride and a hydrocarbon having a molecular weight of not more than 80 and the general formula $RC\equiv CH$, wherein R is of the group consisting of hydrogen atoms, monovalent saturated hydrocarbon radicals and monovalent hydrocarbon radicals containing an ethenic double bond as the sole unsaturation, over a discrete body as catalyst, said body comprising a mercury compound intimately associated with a solid, macromolecular, organic polymer which is substantially unaffected by said mercury compound and by anhydrous hydrogen fluoride, said mixture of hydrogen fluoride and hydrocarbon being passed in gaseous condition over said catalyst under substantially anhydrous conditions at a temperature between 0° C. and the temperature at which said organic polymer softens.

2. The process for obtaining a fluorohydrocarbon, which comprises passing a mixture of hydrogen fluoride and a hydrocarbon having a molecular weight of not more than 80 and the general formula $RC\equiv CH$, wherein R is of the group consisting of hydrogen atoms, monovalent saturated hydrocarbon radicals and monovalent hydrocarbon radicals containing an ethenic double bond as the sole unsaturation, over a plurality of filaments as catalyst, said filaments comprising basic mercuric nitrate intimately associated with a solid, macromolecular, synthetic, organic polymer which is substantially unaffected by anhydrous hydrogen fluoride and by said basic mercuric nitrate, said mixture of hydrogen fluoride and hydrocarbon being passed in gaseous condition over said catalyst under substantially anhydrous conditions at a temperature within the range of from 20° C. to 100° C., the mol ratio of hydrogen fluoride to hydrocarbon in said mixture being within the range of from 3.5:1 to 1:2.

3. The process for obtaining a fluorohydrocarbon, which comprises passing a mixture of hydrogen fluoride and a hydrocarbon of molecular weight not greater than 80 and having the general formula

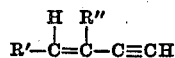

wherein R' and R'' are of the group consisting of hydrogen atoms and monovalent, saturated hydrocarbon radicals, over a plurality of filaments, said filaments having diameters within the range of from 0.01 mm. to 0.5 mm. and comprising basic mercuric nitrate intimately associated with a solid, macromolecular, synthetic, organic polymer which is substantially unaffected by anhydrous hydrogen fluoride and by said basic mercuric nitrate, the ratio by weight of mercuric nitrate to organic polymer in said filaments being within the range of from 1:19 to 19:1, said mixture of hydrogen fluoride and hydrocarbon being passed in gaseous condition over said catalyst under substantially anhydrous conditions at a temperature within the range of from 20° C. to 100° C., the mol ratio of hydrogen fluoride to hydrocarbon in said mixture being within the range of from 3.5:1 to 1:2.

4. The process for obtaining vinyl fluoride, which comprises passing a mixture of hydrogen fluoride and acetylene, in which the mol ratio of hydrogen fluoride to acetylene is within the range of from 1.5:1 to 1:2, over filaments as catalyst, said filaments having diameters within the range of from 0.01 mm. to 0.5 mm. and comprising basic mercuric nitrate intimately associated with a solid, macromolecular, synthetic, organic polymer which is substantially unaffected by anhydrous hydrogen fluoride and by said basic mercuric nitrate, the ratio by weight of basic mercuric nitrate to organic polymer in said filaments being within the range of from 7:3 to 9:1, said filaments being present in an amount such that the concentration of basic mercuric nitrate, calculated as elemental mercury, is within the range of from 10 g. to 250 g. per liter of reactor space, said mixture of hydrogen fluoride and acetylene being passed in gaseous condition over said catalyst under substantially anhydrous conditions at a temperature within the range of from 25° C. to 60° C.

5. The process set forth in claim 4 wherein the polymer is a chlorotrifluoroethylene/tetrafluoroethylene/vinyl fluoride interpolymer containing by weight from 20% to 90% chlorotrifluoroethylene, from 5% to 75% tetrafluoroethylene and from 10% to 80% vinyl fluoride, and wherein the filaments have diameters within the range of from 0.02 to 0.1 mm. and the time of contact of the gaseous mixture with the catalyst is within the range of from 10 seconds to 100 seconds.

6. The process for obtaining 2-fluoro-1,3-butadiene, which comprises passing a mixture of hydrogen fluoride and monovinylacetylene, in which the mol ratio of hydrogen fluoride to monovinylacetylene is within the range of from 1.5:1 to 1:2, over filaments as catalyst, said filaments having diameters within the range of from 0.01 mm. to 0.5 mm. and comprising basic mercuric nitrate intimately associated with a solid, macromolecular, synthetic, organic polymer which is substantially unaffected by anhydrous hydrogen fluoride and by said basic mercuric nitrate, the ratio by weight of basic mercuric nitrate to organic polymer in said filaments being within the range of from 7:3 to 9:1, said filaments being present in an amount such that the concentration of basic mercuric nitrate, calculated as elemental mercury, is within the range of from 75 g. to 100 g. per liter of reactor space, said mixture of hydrogen fluoride and monovinylacetylene being passed in gaseous condition over said catalyst under substantially anhydrous conditions at a temperature within the range of from 25° C. to 60° C.

7. The process set forth in claim 6 wherein the polymer is a chlorotrifluoroethylene/tetrafluoroethylene/vinyl fluoride interpolymer containing by weight from 20% to 90% chlorotrifluoroethylene, from 5% to 75% tetrafluoroethylene and from 10% to 80% vinyl fluoride, and wherein the filaments have diameters within the range of from 0.02 to 0.1 mm. and the time of contact of the gaseous mixture with the catalyst is within the range of from 10 seconds to 100 seconds.

LEROY FRANK SALISBURY.

REFERENCES CITED

The following references are of record in the file of this patent:

UNITED STATES PATENTS

| Number | Name | Date |
| --- | --- | --- |
| 1,950,431 | Carothers et al. | Mar. 13, 1934 |
| 1,999,345 | Stevens et al. | Apr. 30, 1935 |
| 2,118,901 | Soll | May 31, 1938 |
| 2,230,654 | Plunkett | Feb. 4, 1941 |
| 2,287,934 | Grosse et al. | June 30, 1942 |
| 2,401,850 | Whitman | June 11, 1946 |

FOREIGN PATENTS

| Number | Country | Date |
| --- | --- | --- |
| 677,071 | Germany | June 17, 1939 |

OTHER REFERENCES

Catalysts, Berkman et al., Reinhold Pub. Corp., N. Y., 1940, pages 694, 733, 787, 928 and 947.